(12) United States Patent
Wang et al.

(10) Patent No.: US 11,698,089 B2
(45) Date of Patent: Jul. 11, 2023

(54) FASTENER OPERATING STRUCTURE

(71) Applicant: FIVETECH TECHNOLOGY INC., New Taipei (TW)

(72) Inventors: Ting-Jui Wang, New Taipei (TW); Ying-Te Yu, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 669 days.

(21) Appl. No.: 16/746,945

(22) Filed: Jan. 19, 2020

(65) Prior Publication Data

US 2020/0240451 A1 Jul. 30, 2020

(30) Foreign Application Priority Data

Jan. 25, 2019 (TW) ................................. 108201291

(51) Int. Cl.
| | |
|---|---|
| *E05B 1/00* | (2006.01) |
| *F16B 5/02* | (2006.01) |
| *E05B 9/00* | (2006.01) |
| *E05B 15/10* | (2006.01) |
| *E05B 9/02* | (2006.01) |

(52) U.S. Cl.
CPC ............ *F16B 5/0208* (2013.01); *E05B 9/002* (2013.01); *E05B 15/101* (2013.01); *E05B 15/102* (2013.01); *E05B 9/02* (2013.01); *Y10T 292/0969* (2015.04)

(58) Field of Classification Search
CPC ........... Y10T 292/0969; Y10T 292/097; Y10T 292/0971; Y10T 292/0993; Y10T 292/1039; Y10T 292/0977; Y10T 292/1016; Y10T 292/216; Y10T 24/45654; F16B 2/18; F16B 1/02; E05B 15/101; E05B 15/102; E05B 17/0025; E05C 1/08; E05C 1/10; A44B 11/2526
See application file for complete search history.

(56) References Cited

U.S. PATENT DOCUMENTS

| | | | | |
|---|---|---|---|---|
| 305,125 | A * | 9/1884 | Williams | ............ E05B 63/0017 |
| | | | | 292/DIG. 29 |
| 477,801 | A * | 6/1892 | Hayes | ..................... E05B 77/52 |
| | | | | 292/182 |
| 595,290 | A * | 12/1897 | Dowman | .............. E05B 63/128 |
| | | | | 292/169.14 |
| 659,021 | A * | 10/1900 | Fulton | ................. E05B 63/0017 |
| | | | | 292/140 |

(Continued)

FOREIGN PATENT DOCUMENTS

| | | | |
|---|---|---|---|
| CN | 103016474 A | 4/2013 | |
| FR | 2750177 A1 * | 12/1997 | ............. E05B 79/20 |

(Continued)

*Primary Examiner* — Carlos Lugo

(57) ABSTRACT

A fastener operating structure includes a holding base and a fastening-connecting unit. The holding base is disposed at a first object. The fastening-connecting unit is movably disposed at the holding base. The fastening-connecting unit is fastened to a second object. Consequently, the holding base is disposed at the first object, and the fastening-connecting unit is coupled to or removed from the second object, so as to couple together and separate the first and second objects repeatedly and quickly.

19 Claims, 13 Drawing Sheets

(56) References Cited

U.S. PATENT DOCUMENTS

| | | | | | |
|---|---|---|---|---|---|
| 758,942 | A | * | 5/1904 | Taylor | E05B 63/0017 292/DIG. 15 |
| 777,408 | A | * | 12/1904 | Fletcher | E05B 77/52 292/182 |
| 939,174 | A | * | 11/1909 | Schlapbach | E05B 63/128 292/341.15 |
| 962,827 | A | * | 6/1910 | Gill | E05C 1/10 292/148 |
| 1,719,755 | A | * | 7/1929 | Clavette | E06B 3/44 160/90 |
| 2,316,290 | A | * | 4/1943 | Schenbeck | B62D 33/03 248/316.4 |
| 2,904,347 | A | * | 9/1959 | Bryant | A44B 11/2526 24/116 R |
| 3,339,955 | A | * | 9/1967 | Leonard | E05C 1/10 292/175 |
| 3,984,136 | A | * | 10/1976 | Bills | E05C 1/06 292/62 |
| 5,887,915 | A | * | 3/1999 | Ramsauer | E05C 9/185 292/DIG. 20 |
| 7,708,322 | B2 | * | 5/2010 | Timothy | E05C 9/063 292/DIG. 20 |
| 8,313,127 | B2 | * | 11/2012 | Helms | F41H 5/26 292/DIG. 21 |

FOREIGN PATENT DOCUMENTS

| | | | | | |
|---|---|---|---|---|---|
| GB | 191301675 | A | * | 2/1914 | |
| GB | 269035 | A | * | 4/1927 | |
| GB | 2180586 | A | * | 4/1987 | E05C 1/06 |
| JP | 2007139056 | A | * | 6/2007 | |

\* cited by examiner

3

(a)       (b)       (c)

22

(a)    (b)    (c)    (d)    (e)

FASTENER OPERATING STRUCTURE

CROSS-REFERENCE TO RELATED APPLICATION

This non-provisional application claims priority under 35 U.S.C. § 119(a) on Patent Application No(s). 108201291 filed in Taiwan, R.O.C. on Jan. 25, 2019, the entire contents of which are hereby incorporated by reference.

BACKGROUND OF THE INVENTION

1. Field of the Invention

The present disclosure relates to fastener operating structures, and in particular to a fastener operating structure capable of coupling together and separating objects repeatedly and quickly.

2. Description of the Related Art

Conventionally, coupling together objects is usually achieved by screws.

Although the prior art is effective in coupling together objects in an inseparable way, it has a drawback: the objects are not only difficult to mount in place but also difficult to demount because they are fixed in place by screws.

Therefore, it is important to provide a fastener operating structure capable of coupling together and separating objects repeatedly and quickly.

BRIEF SUMMARY OF THE INVENTION

An objective of the present disclosure is to provide a fastener operating structure capable of coupling together and separating objects repeatedly and quickly.

To achieve at least the above objective, the present disclosure provides a fastener operating structure which comprises a holding base and a fastening-connecting unit. The holding base is disposed at a first object. The fastening-connecting unit is movably disposed at the holding base. The fastening-connecting unit is fastened to a second object.

Regarding the fastener operating structure, the holding base has at least one holding portion whereby the holding base is disposed at the first object.

Regarding the fastener operating structure, the holding base has a movement space, and the fastening-connecting unit is movably disposed in the movement space.

Regarding the fastener operating structure, limiting portions are disposed on a top surface of the holding base, located on one or two sides of the movement space, and adapted to limit rotation of the fastening-connecting unit.

Regarding the fastener operating structure, the fastening-connecting unit comprises an operating portion and a fastening portion, the fastening portion being movably disposed at the holding base, wherein the operating portion and the fastening portion are movably fitted together, fixedly fitted together or integrally formed.

Regarding the fastener operating structure, the operating portion and the fastening portion are movably fitted together by a bolt member.

Regarding the fastener operating structure, the fastening portion has a shaft member and a fastening member, and the shaft member is disposed on a surface of the fastening member.

Regarding the fastener operating structure, one end of the operating portion has a guiding surface, and the guiding surface of the operating portion in operation abuts against the holding base.

The fastener operating structure further comprises a resilient component with two ends abutting against the holding base and the fastening-connecting unit, respectively.

Regarding the fastener operating structure, the resilient component is a laminated spring, non-laminated spring, leaf spring, resilient post member or spring.

Regarding the fastener operating structure, the resilient component is a non-laminated spring whose contraction does not require lamination, thereby taking up little space.

Regarding the fastener operating structure, the fastening-connecting unit has a fastening portion, and the fastening portion is a raised fastening member, dented fastening member, post member, thread member or resilient fastening member.

Regarding the fastener operating structure, the holding base has a receiving space for receiving a resilient component in whole or in part or receiving a fastening portion of the fastening-connecting unit.

Regarding the fastener operating structure, the holding portion is locked to, engaged with, riveted to, welded to, expanded to or fastened to the first object.

Regarding the fastener operating structure, the holding portion has a material storage space, and the holding base has a stamped surface which an external force is exerted on to press the holding portion into the first object and allow a material of the first object to enter or flow into the material storage space, thereby fitting the holding base and the first object together.

Regarding the fastener operating structure, the holding base has an abutting surface which an external force is exerted on, and the holding portion has an engaging portion which an external force is exerted on to allow an external force to be exerted on the abutting surface of the holding base such that the engaging portion is deformed and engaged with the first object, thereby fitting the holding base and the first object together.

Regarding the fastener operating structure, the holding base has a stamped surface or an abutting surface.

Regarding the fastener operating structure, the fastener operating structure is taken out of a carrier with a tool, placed on the first object and thus fitted to the first object.

Regarding the fastener operating structure, the holding base has a weldable surface such that the fastener operating structure is taken out of a carrier with a tool and placed on the first object so as to be welded to the weldable surface and thus fitted to the first object.

Regarding the fastener operating structure, the fastener operating structure is taken out of a carrier with a tool, and then a corresponding device calculates predetermined positions of the fastener operating structure and the first object, thereby allowing the tool to precisely place the fastener operating structure at a position for fitting to the first object, thereby fitting the fastener operating structure to the first object.

Regarding the fastener operating structure, the corresponding device is a vision comparison device, image comparison device or distance calculation device.

Regarding the fastener operating structure, the fastening portion is fastened to the second object, and the second object has a corresponding fastening portion which the fastening portion is fastened to, the corresponding fastening portion having a wide hole portion and a fastened portion, the wide hole portion being larger than the fastening portion, the fastened portion being smaller than the fastening portion, wherein the fastening portion penetrates the wide hole portion so as to be fastened to the fastened portion.

Regarding the fastener operating structure, the shaft member of the fastening portion has a smaller width than the fastening member.

Regarding the fastener operating structure, the shaft member of the fastening portion has a smaller width than the fastening member to allow the fastening member to penetrate the second object, and the shaft member whose width is smaller than the fastened portion is fastened to a fastened portion of the second object such that the fastening member is fastened to the second object.

Regarding the fastener operating structure, the holding portion is a raised portion, dented portion, bolt portion, hole portion, ring-shaped portion, ring-shaped member, groove portion or fastening member.

Regarding the fastener operating structure, the holding base has a movement space in which the fastening-connecting unit undergoes vertical movement, lateral movement or rotational movement.

Regarding the fastener operating structure, in the movement space, the fastening-connecting unit moves vertically, laterally or rotationally, moves vertically and then laterally or rotationally, moves laterally and then vertically or rotationally, or moves rotationally and then vertically or laterally, so as for the fastening-connecting unit to be fastened to the second object.

Regarding the fastener operating structure, the fastening-connecting unit is vertically fastened to the second object, or the fastening portion is laterally fastened to the second object, or the fastening portion is rotationally fastened to the second object.

Regarding the fastener operating structure, a buoyancy displacement exists between the holding base and the fastening-connecting unit.

Regarding the fastener operating structure, the holding base and the first object are integrally formed.

Regarding the fastener operating structure, the holding base has a laterally penetrating portion, the second object laterally enters the laterally penetrating portion such that the fastening portion of the fastening-connecting unit is fastened to a fastened portion of the second object.

Regarding the fastener operating structure, the holding base has a laterally penetrating portion such that the second object laterally enters the laterally penetrating portion and pushes a guiding portion on a side of the fastening portion to guide elevation of the fastening portion, thereby fastening the fastening portion of the fastening-connecting unit to a fastened portion of the second object.

Regarding the fastener operating structure, the holding base has a laterally penetrating portion such that the second object laterally enters the laterally penetrating portion and pushes a guiding portion on a side of the fastening portion to guide elevation of the fastening portion, thereby fastening the fastening portion of the fastening-connecting unit to a fastened portion of the second object, wherein absence of any guiding portion on another side of the fastening portion; thus, the second object is fastened by the fastening portion, unfastening the second object requires operating the operating portion to lift the fastening portion.

Regarding the fastener operating structure, the operating portion is a rotating element, the operating portion has a high portion and a low portion for respectively driving the fastening portion to undergo high and low movement to unfasten and fasten the second object.

Regarding the fastener operating structure, the laterally penetrating portion is a lateral groove portion or hole portion.

Regarding the fastener operating structure, the guiding portion is an oblique surface portion, curved surface portion or arcuate surface portion.

Regarding the fastener operating structure, the fastening-connecting unit has a shaft member and a fastening member such that the shaft member or the fastening member has a rotation-preventing portion, and the holding base has a corresponding rotation-preventing portion, wherein the rotation-preventing portion and the corresponding rotation-preventing portion jointly prevent rotation.

Consequently, a fastener operating structure of the present disclosure is capable of mounting a holding base on a first object and coupling the first object to or removing the first object from a second object with a fastening-connecting unit to thereby couple together and separate the first and second objects repeatedly and quickly.

DETAILED DESCRIPTION OF THE INVENTION

To facilitate understanding of the object, characteristics and effects of this present disclosure, embodiments together with the attached drawings for the detailed description of the present disclosure are provided.

Referring to FIG. 1 through FIG. 6, the present disclosure provides a fastener operating structure which comprises a holding base 1 and a fastening-connecting unit 2.

The holding base 1 is disposed at a first object 10.

The fastening-connecting unit 2 is movably disposed at the holding base 1. The fastening-connecting unit 2 is fastened to a second object 20.

Figure 4:
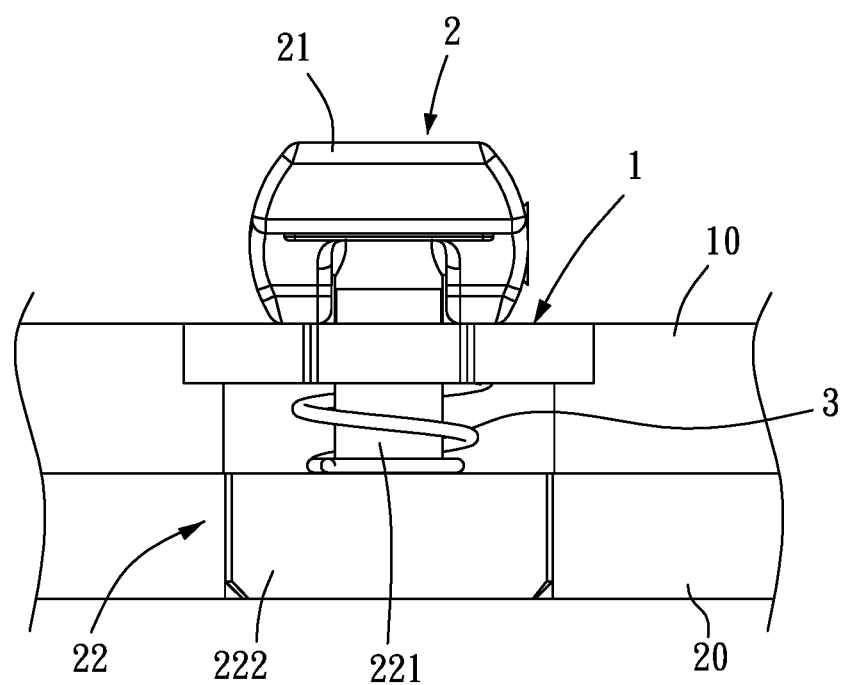
FIG. 4 is the second schematic view of how to operate the first embodiment of the present disclosure.
Figure 5:
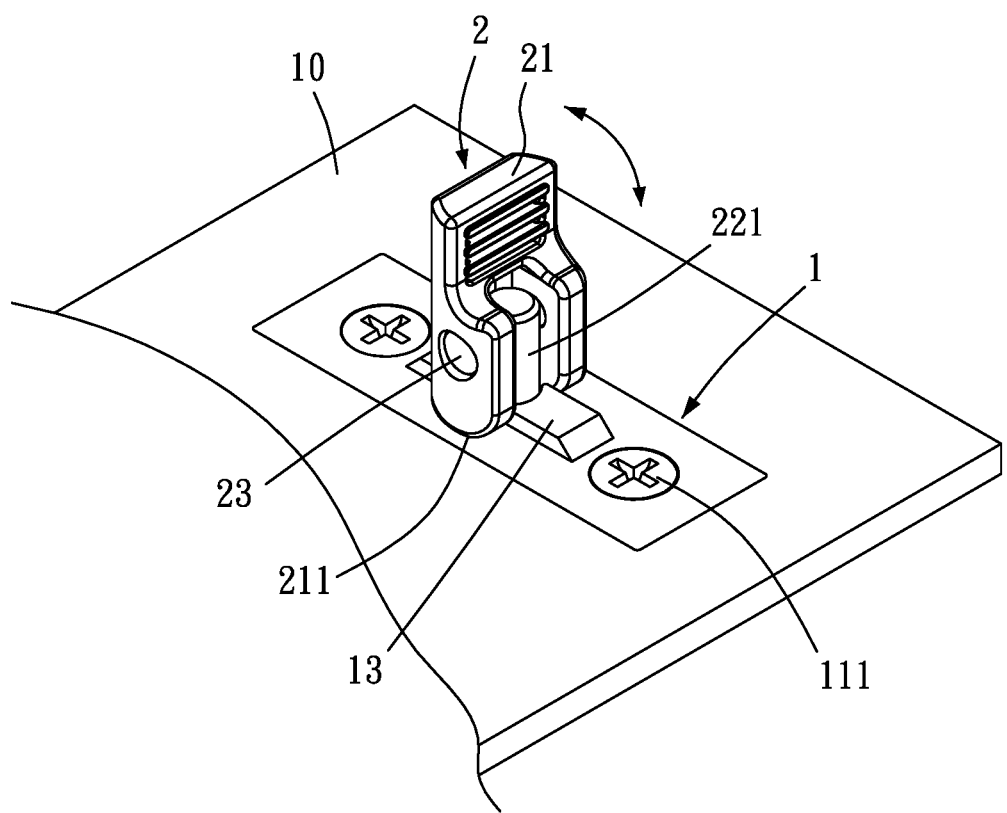
FIG. 5 is the third schematic view of how to operate the first embodiment of the present disclosure.
Figure 6:
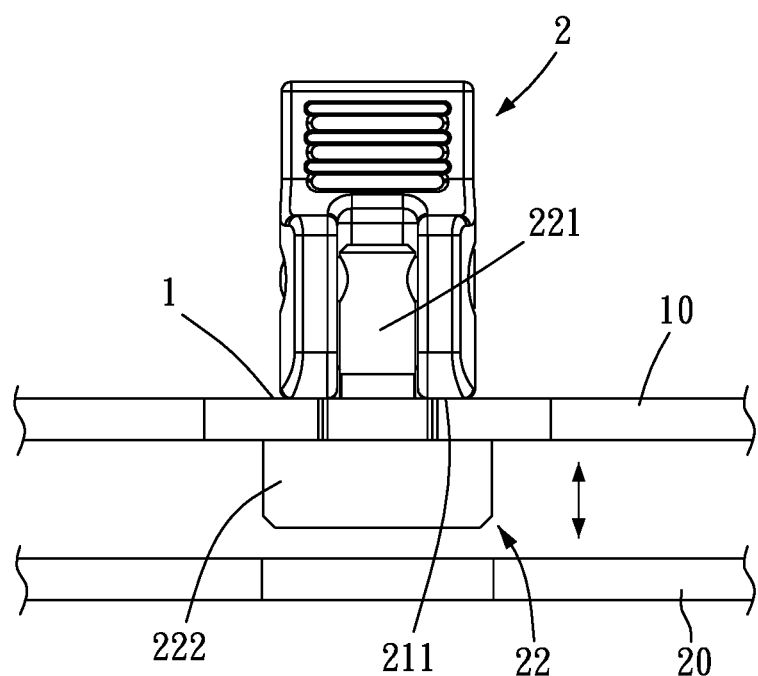
FIG. 6 is the fourth schematic view of how to operate the first embodiment of the present disclosure.

Operation of the present disclosure begins with fixing the holding base 1 to a fitting portion 101 of the first object 10 and then moving the fastening-connecting unit 2 to allow the fastening-connecting unit 2 to be fastened to or removed from the second object 20, so as to couple together and separate the first object 10 and the second object 20 repeatedly and quickly (as shown in FIG. 4 through FIG. 6).

In a preferred embodiment of the present disclosure, the holding base 1 has at least one holding portion 11. The holding portion 11 is a through hole. The holding portion 11 and a fixing component 111 together fix the holding base 1 to the first object 10. Consequently, the holding base 1 is firmly disposed on the first object 10 such that the fastening-connecting unit 2 can steadily move along on the holding base 1 (as shown in FIG. 3 through FIG. 6). In a variant embodiment, the holding base 1 and the first object 10 are integrally formed (not shown) as needed.

The holding portion 11 is locked to, engaged with, riveted to, welded to, expanded to or fastened to the first object 10 (not shown). The holding portion 11 is a raised portion, dented portion, bolt portion, hole portion, ring-shaped portion, ring-shaped member, groove portion or fastening member.

Figure 1:
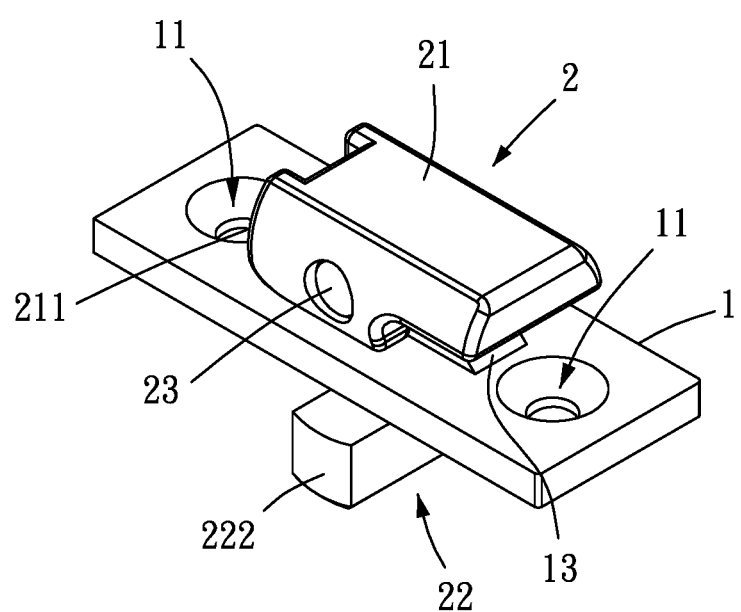
FIG. 1 is a perspective view according to a preferred embodiment of the present disclosure.
Figure 2:
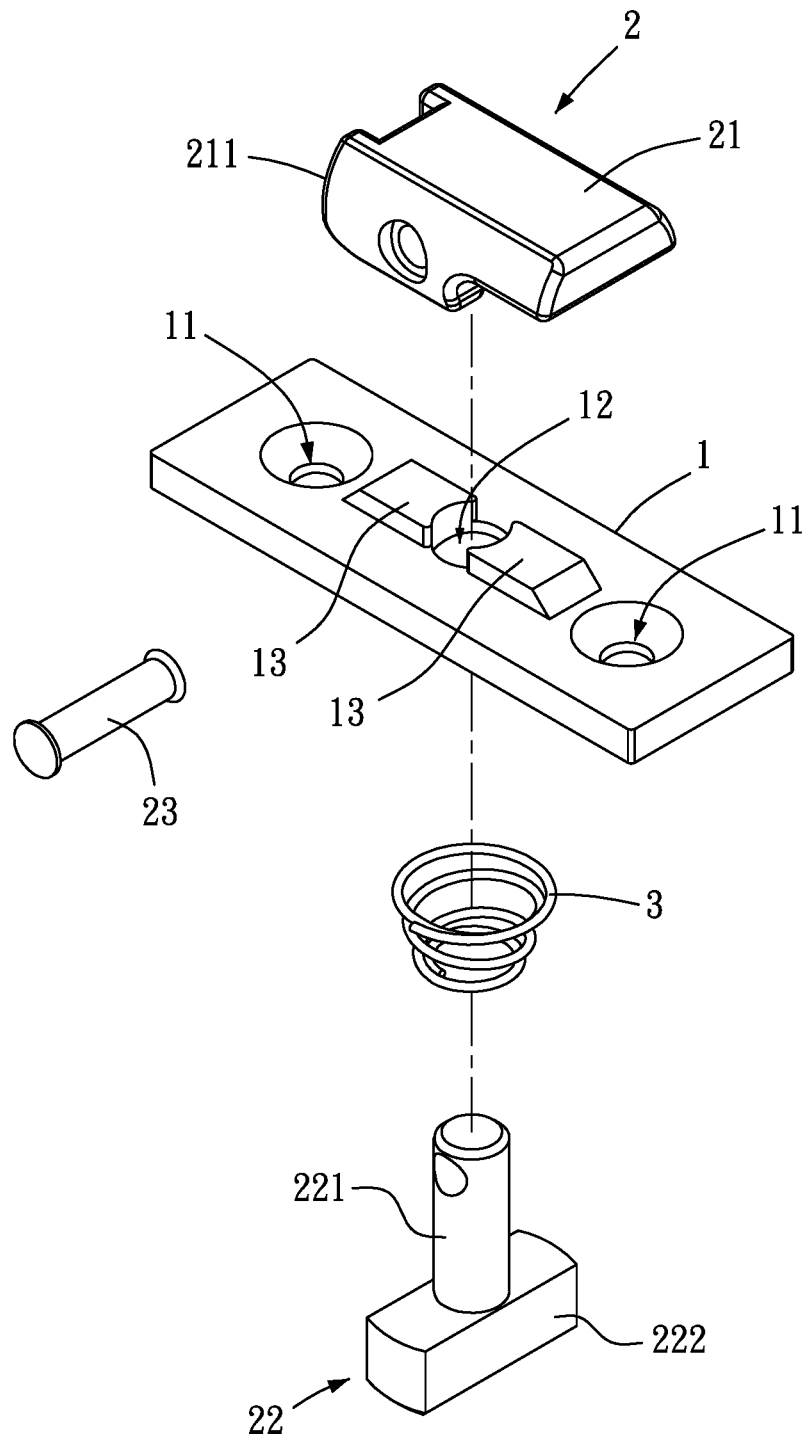
FIG. 2 is an exploded view according to the first embodiment of the present disclosure.
Figure 3:
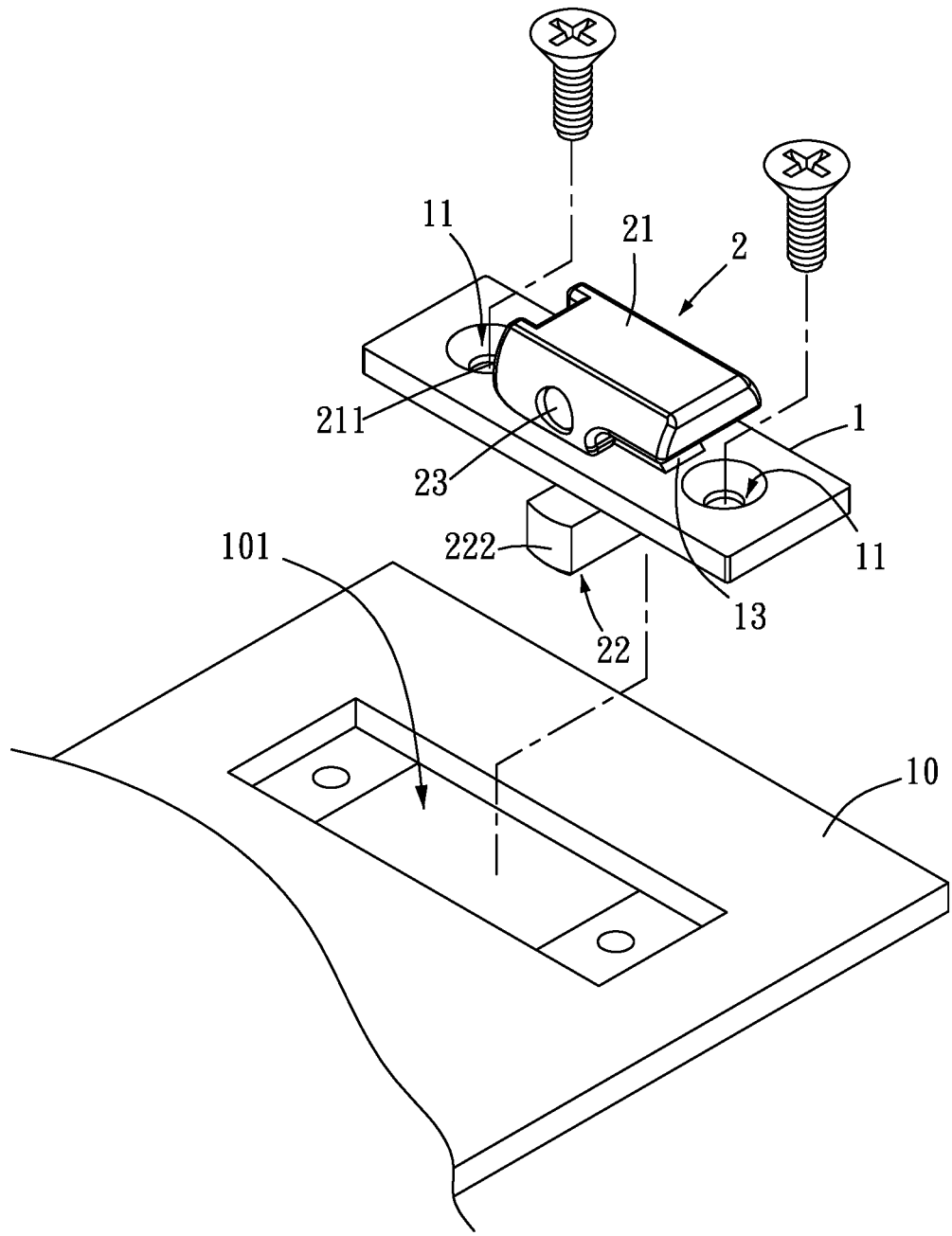
FIG. 3 is a schematic view of how to operate the first embodiment of the present disclosure.

In a preferred embodiment of the present disclosure, the holding base 1 has a movement space 12, and the fastening-connecting unit 2 is movably disposed in the movement space 12. Consequently, owing to the movement space 12, the fastening-connecting unit 2 not only steadily moves along on the holding base 1 (as shown in FIG. 2) but also vertically moves within the movement space 12 so as to be fastened to the second object 20. If the movement space 12 is laterally widened, the fastening-connecting unit 2 can move laterally within the movement space 12 so as to be fastened to the second object 20 (not shown).

In a preferred embodiment of the present disclosure, at least two limiting portions 13 are disposed on the top surface of the holding base 1. The limiting portions 13 are disposed on two sides of the movement space 12, respectively. The limiting portions 13 limit the rotation of the fastening-connecting unit 2. Consequently, owing to the movement space 12, the fastening-connecting unit 2 can move up or down relative to the holding base 1 vertically and steadily. The limiting portions 13 limit the rotation of the fastening-connecting unit 2 relative to the holding base 1 (as shown in FIG. 2 through FIG. 6).

In a preferred embodiment of the present disclosure, the fastening-connecting unit 2 comprises an operating portion 21 and a fastening portion 22. The fastening portion 22 is movably disposed in the movement space 12 of the holding base 1. The operating portion 21 movably fits to the fastening portion 22. In a variant embodiment, the operating portion 21 and the fastening portion 22 are integrally formed (not shown). Consequently, the user can rotate and render the operating portion 21 parallel or perpendicular to the holding base 1 and thus allow the operating portion 21 to drive the fastening portion 22 moving down or up within the movement space 12 vertically. Therefore, the fastening portion 22 is fastened to or removed from the second object 20 to couple together and separate the first object 10 and the second object 20 repeatedly and quickly (as shown in FIG. 2 through FIG. 6).

The fastening-connecting unit 2 rotates the operating portion 21 such that the fastening portion 22 undergoes rotational movement within the movement space 12 and thus is fastened to the second object 20. The fastening-connecting unit 2 undergoes vertical movement and then lateral or rotational movement within the movement space 12 so as to be fastened to the second object 20. Alternatively, the fastening-connecting unit 2 undergoes lateral movement and then vertical or rotational movement so as to be fastened to the second object 20. Alternatively, the fastening-connecting unit 2 undergoes rotational movement and then vertical or lateral movement so as to be fastened to the second object 20 (not shown).

In a preferred embodiment of the present disclosure, the operating portion 21 and the fastening portion 22 are movably fitted together by a bolt member 23. Consequently, the user can rotate and render the operating portion 21 parallel or perpendicular to the holding base 1 and thus allow the operating portion 21 to operate in conjunction with the bolt member 23 and thereby drive the fastening portion 22 moving down or up within the movement space 12 vertically. Therefore, the fastening portion 22 is fastened to or removed from the second object 20 to couple together or separate the first object 10 and the second object 20 repeatedly and quickly (as shown in FIG. 1 through FIG. 3 and FIG. 5).

In a preferred embodiment of the present disclosure, the fastening portion 22 has a shaft member 221 and a fastening member 222. The shaft member 221 is disposed on a surface of the fastening member 222. The shaft member 221 and the operating portion 21 are movably fitted together by the bolt member 23. The shaft member 221 is movably penetratingly disposed in the movement space 12. Consequently, the user can rotate and render the operating portion 21 parallel or perpendicular to the holding base 1 and thus allow the operating portion 21 to operate in conjunction with the bolt member 23 and thereby drive the shaft member 221 of the fastening portion 22 moving down or up within the movement space 12 vertically. Therefore, the shaft member 221 drives the fastening member 222 being fastened to or removed from the second object 20 so as to couple together and separate the first object 10 and the second object 20 repeatedly and quickly (as shown in FIG. 2, FIG. 4 through FIG. 6).

In a preferred embodiment of the present disclosure, one end of the operating portion 21 has a guiding surface 211, and the guiding surface 211 of the operating portion 21 in operation abuts against the holding base 1. Consequently, the user can rotate and render the operating portion 21 parallel or perpendicular to the holding base 1 and thus allow the operating portion 21 to operate in conjunction with the guiding surface 211 and thereby abut against the holding base 1. Therefore, the operating portion 21 smoothly moves from the top of the holding base 1 to a parallel or vertical position and thus easily drives the shaft member 221 of the fastening portion 22 moving down or up within the movement space 12 vertically. Therefore, the shaft member 221 drives the fastening member 222 being fastened to or removed from the second object 20 so as to couple together and separate the first object 10 and the second object 20 repeatedly and quickly (as shown in FIG. 1 through FIG. 3, FIG. 5 and FIG. 6).

In a preferred embodiment of the present disclosure, the fastener operating structure further comprises a resilient component 3. Two ends of the resilient component 3 abut against the bottom surface of the holding base 1 and the fastening member 222 of the fastening-connecting unit 2, respectively. Consequently, the user can rotate and render the operating portion 21 parallel to the holding base 1 and thus allow the operating portion 21 to operate in conjunction with the guiding surface 211 and thereby abut against the holding base 1. Therefore, the operating portion 21 smoothly moves from the top of the holding base 1 to a parallel position and thereby drives the shaft member 221 of the fastening portion 22 moving down within the movement space 12 vertically. Therefore, the shaft member 221 drives the fastening member 222 being fastened to the second object 20 and compressing the resilient component 3 such that the fastening member 222 is located at a locked position, so as to couple together the first object 10 and the second object 20. The user can rotate and render the operating portion 21 perpendicular to the holding base 1 and thus allow the operating portion 21 to operate in conjunction with the guiding surface 211 and thereby abut against the holding base 1. Therefore, the operating portion 21 smoothly moves from the top of the holding base 1 to a vertical position and thereby drives the shaft member 221 of the fastening portion 22 moving up within the movement space 12 vertically. Therefore, the shaft member 221 drives the fastening member 222 being removed from the second object 20, so as to not only separate the first object 10 and the second object 20 but also release the resilient component 3 such that the fastening member 222 moves to an unlocked position under the push of the resilient component 3, so as to effect fastening and locking again. Therefore, the fastener operating structure is effective in coupling together and separating at least two objects repeatedly and quickly (as shown in FIG. 2 and FIG. 4).

The resilient component 3 is a laminated spring, non-laminated spring, leaf spring, resilient post member or spring. The embodiments of present disclosure are exemplified by a non-laminated spring but are not limited thereto.

Figure 7:
FIG. 7 is a schematic view of different forms of a resilient component according to the first embodiment of the present disclosure.
Figure 7:
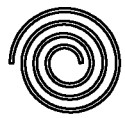
Figure 7:
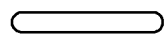

In a preferred embodiment of the present disclosure, the resilient component 3 is a non-laminated spring whose contraction does not require lamination, thereby taking up little space (as shown in FIG. 2 and FIG. 7). Referring to FIG. 7, part a is a lateral view of a non-laminated spring expanded, part b is a front view of the non-laminated spring, and part c is the lateral view of the non-laminated spring compressed.

Figure 8:
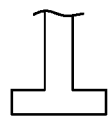
FIG. 8 is a schematic view of different forms of a fastening portion of the present disclosure.
Figure 8:
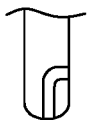
Figure 8:
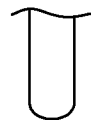
Figure 8:
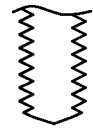
Figure 8:
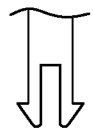

In a preferred embodiment of the present disclosure, the fastening portion 22 of the fastening-connecting unit 2 is a raised fastening member (part a in FIG. 8), dented fastening member (part b in FIG. 8), post member (part c in FIG. 8), thread member (part d in FIG. 8) or resilient fastening member (part e in FIG. 8).

Figure 9:
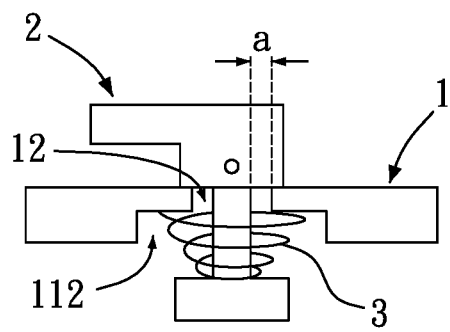
FIG. 9 is a schematic view of how to operate the second embodiment of the present disclosure.

In a preferred embodiment of the present disclosure, the holding base 1 has a receiving space 112 for receiving the resilient component 3 (shown in FIG. 9) in whole or in part or receiving the fastening portion 22 (not shown) of the fastening-connecting unit 2.

A buoyancy displacement a (shown in FIG. 9) which ranges from 0.001 mm to 50 mm exists between the holding base 1 and the fastening-connecting unit 2 to enable the fastening-connecting unit 2 to undergo lateral movement within the movement space 12 and thus enable the fastening-connecting unit 2 to be fastened to the second object (not shown).

Figure 10:
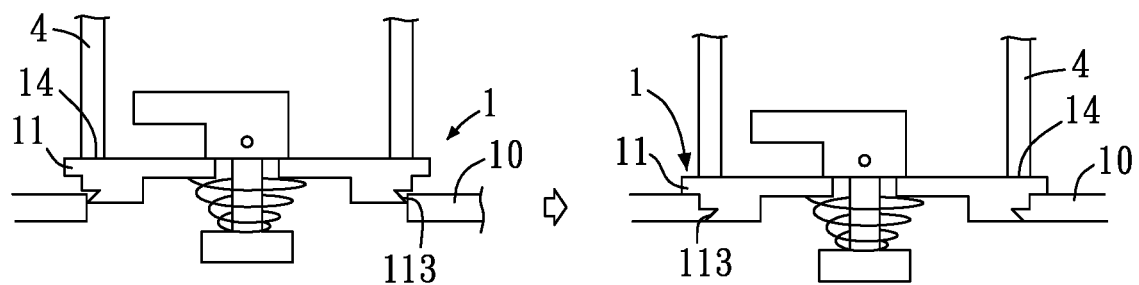
FIG. 10 is a schematic view of how to operate the third embodiment of the present disclosure.

Referring to FIG. 10, in a preferred embodiment of the present disclosure, the holding portion 11 has a material storage space 113 and a stamped surface 14. A die 4 exerts a force on the stamped surface 14; consequently, the material which the first object 10 is made of can enter or flow into the material storage space 113, thereby fitting the holding base 1 and the first object 10 together.

Figure 11:
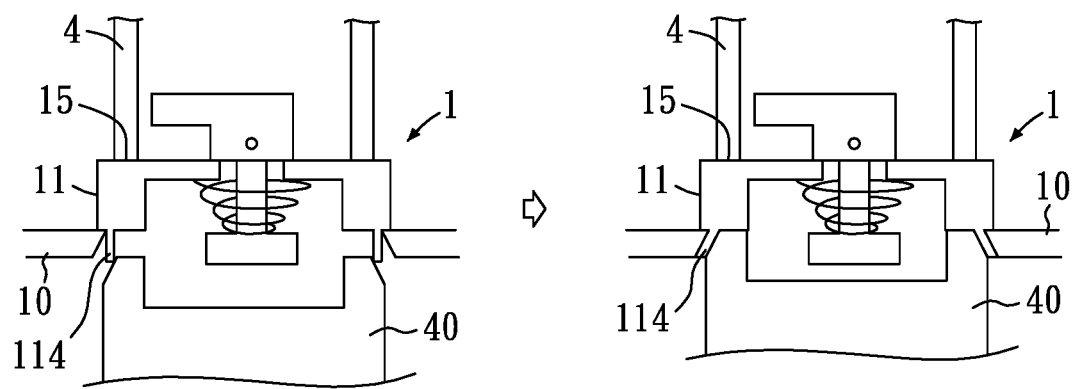
FIG. 11 is a schematic view of how to operate the fourth embodiment of the present disclosure.

Referring to FIG. 11, in a preferred embodiment of the present disclosure, the holding portion 11 has an engaging portion 114, and the holding base 1 has an abutting surface 15. The die 4 abuts against the abutting surface 15, whereas another die 40 exerts a force on the engaging portion 114 such that the engaging portion 114 is deformed and engaged with the first object 10, thereby fitting the holding base 1 and the first object 10 together.

Figure 12:
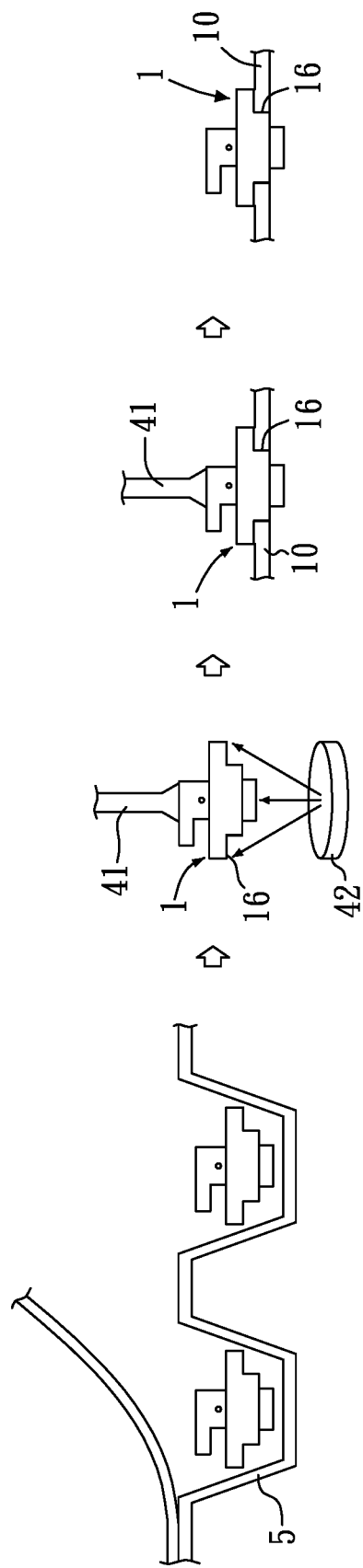
FIG. 12 is a schematic view of how to operate the fifth embodiment of the present disclosure.

Referring to FIG. 12, in a preferred embodiment of the present disclosure, the fastener operating structure is taken out of a carrier 5 with a tool 41, placed on the first object 10 and thus fitted to the first object 10.

In a preferred embodiment of the present disclosure, the holding base 1 has a weldable surface 16. After being taken out of the carrier 5 with the tool 41, the fastener operating structure is placed on the first object 10, so as to be welded to the weldable surface 16 and thus fitted to the first object 10.

In a preferred embodiment of the present disclosure, after the fastener operating structure has been taken out of the carrier 5 with the tool 41, a corresponding device 42 calculates predetermined positions of the fastener operating structure and the first object 10, and then the tool 41 precisely places the fastener operating structure at the position for fitting to the first object 10, thereby allowing the fastener operating structure to be fitted to the first object 10.

In a preferred embodiment of the present disclosure, the corresponding device 42 is a vision comparison device, image comparison device or distance calculation device. Consequently, the present disclosure meets various usage needs.

Figure 13:
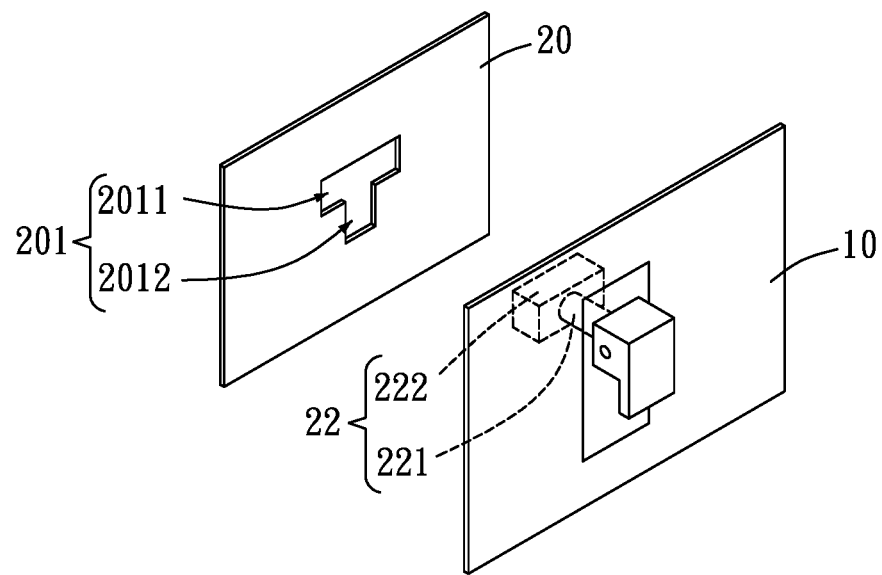
FIG. 13 is the first schematic view of how to operate the sixth embodiment of the present disclosure.
Figure 14:
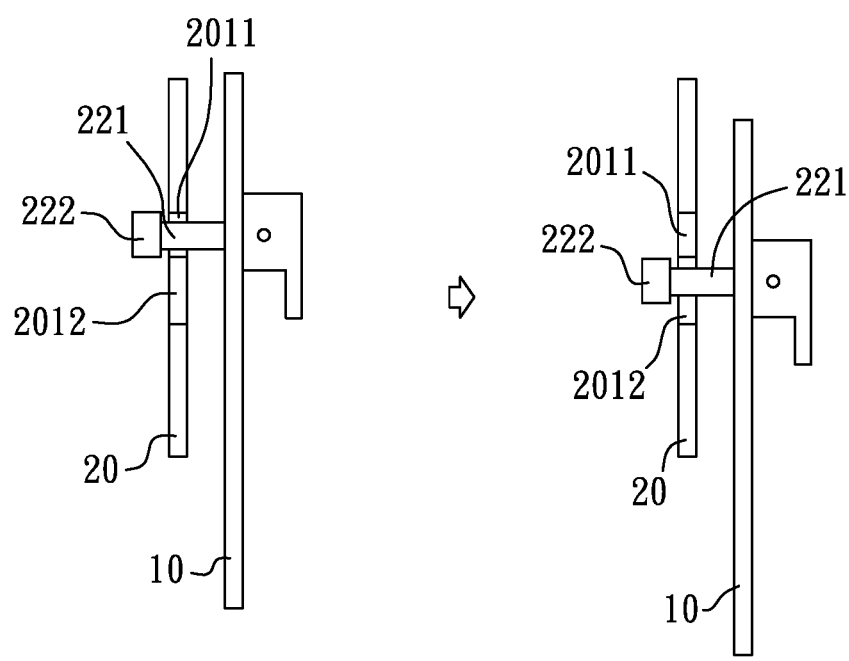
FIG. 14 is the second schematic view of how to operate the sixth embodiment of the present disclosure.

Referring to FIG. 13 and FIG. 14, in a preferred embodiment of the present disclosure, the fastening portion 22 is fastened to the second object 20, and the second object 20 has a corresponding fastening portion 201 which the fastening portion 22 is fastened to. The corresponding fastening portion 201 has a wide hole portion 2011 and a fastened portion 2012. The wide hole portion 2011 is larger than the fastening member 222 of the fastening portion 22. The fastened portion 2012 is smaller than the fastening member 222 of the fastening portion 22. The fastening member 222 of the fastening portion 22 penetrates the wide hole portion 2011 before being fastened to the fastened portion 2012. The shaft member 221 of the fastening portion 22 has a smaller width than the fastening member 222. The shaft member 221 whose width is smaller than the fastened portion 2012 is fastened to the fastened portion 2012 of the second object 20 such that the fastening portion 22 is fastened to the second object 20.

Figure 15:
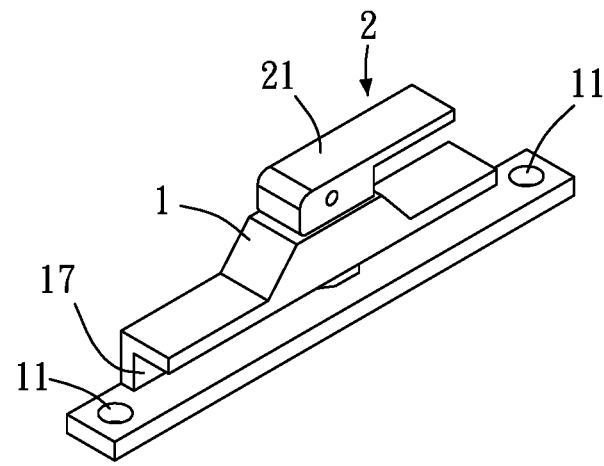
FIG. 15 is a perspective view according to the seventh embodiment of the present disclosure.
Figure 16:
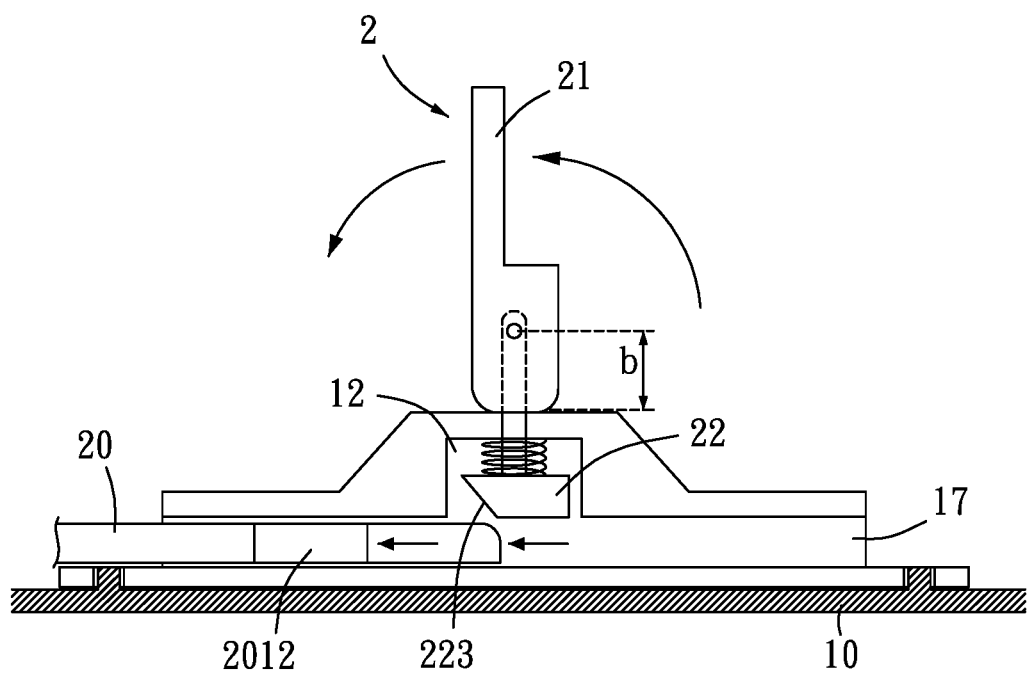
FIG. 16 is a cross-sectional view of how to operate the seventh embodiment of the present disclosure.
Figure 17:
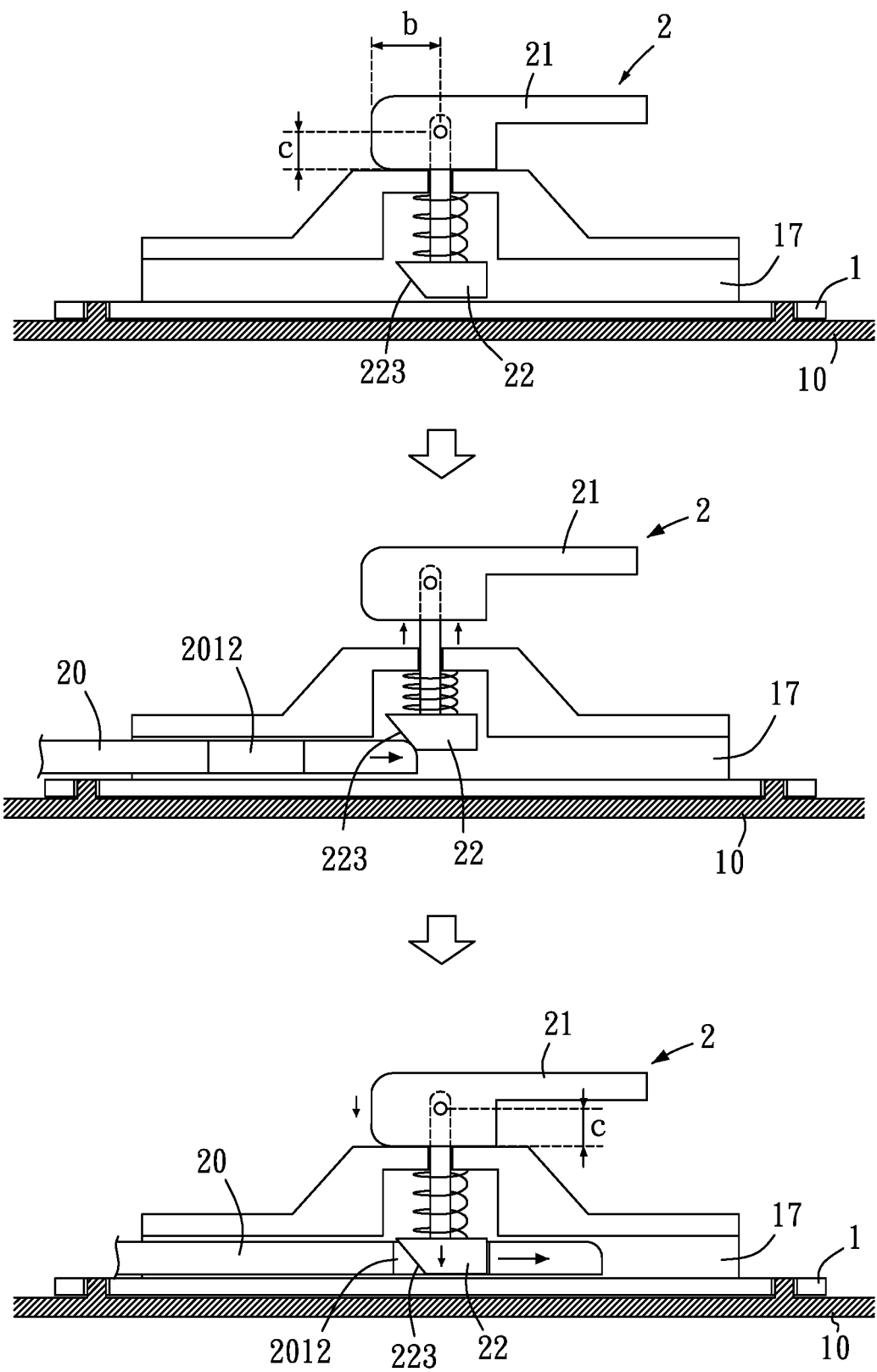
FIG. 17 is a schematic view of how to operate the seventh embodiment of the present disclosure.

Referring to FIG. 15 through FIG. 17, in a preferred embodiment of the present disclosure, the holding base 1 has a laterally penetrating portion 17 such that the second object 20 laterally enters the laterally penetrating portion 17 and pushes a guiding portion 223 on one side of the fastening portion 22 to guide the elevation of the fastening portion 22. Therefore, the resilient component 3 bias the fastening portion 22 when a fastened portion 2012 of the second object 20 is aligned with the fastening portion 22, thereby the fastening portion 22 of the fastening-connecting unit 2 is fastened to a fastened portion 2012 of the second object 20. No guiding portion is present on the other side of the fastening portion 22; thus, the second object 20 is fastened by the fastening portion 22. As a result, unfastening the second object 20 requires operating the operating portion 21 to lift the fastening portion 22. Therefore, the fastener operating structure is effective in coupling together and separating the first object 10 and the second object 20 repeatedly and quickly.

In a preferred embodiment of the present disclosure, the operating portion 21 is a rotating element such that the operating portion 21 has a high portion b and a low portion c for respectively driving the fastening portion 22 to undergo high and low movement to unfasten and fasten the second object 20. Therefore, the present disclosure meets practical needs.

In a preferred embodiment of the present disclosure, the laterally penetrating portion 17 is a lateral groove portion or hole portion, and the guiding portion 223 is an oblique surface portion, curved surface portion or arcuate surface portion. Therefore, the present disclosure meets practical needs.

Figure 18:
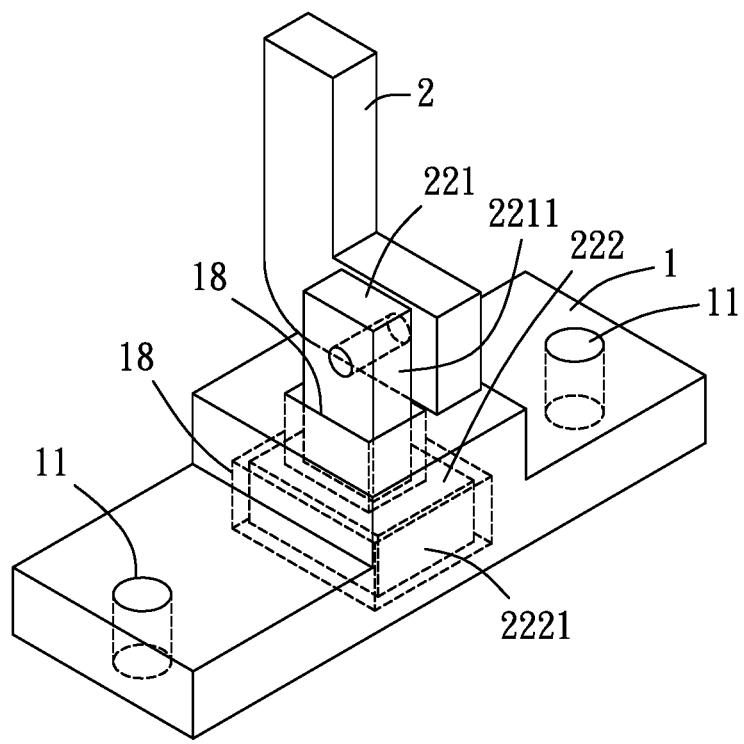
FIG. 18 is a perspective view of the eighth embodiment of the present disclosure.
Figure 19:
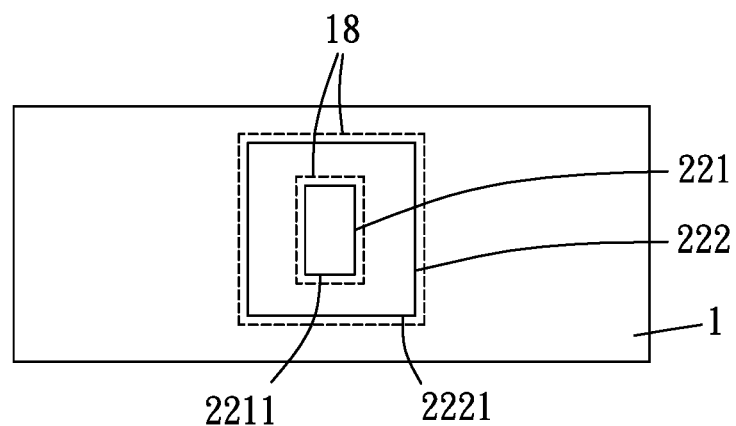
FIG. 19 is a bottom view of the eighth embodiment of the present disclosure.

Referring to FIG. 18 and FIG. 19, in a preferred embodiment of the present disclosure, the fastening-connecting unit 2 has a shaft member 221 and a fastening member 222. The shaft member 221 or the fastening member 222 has a rotation-preventing portion 2211, 2221. The holding base 1 has a corresponding rotation-preventing portion 18. The rotation-preventing portion 2211, 2221 and the corresponding rotation-preventing portion 18 jointly prevent rotation to limit the direction which the fastening-connecting unit 2 moves in on the holding base 1, thereby allowing the present disclosure to meet practical needs.

While the present disclosure has been described by means of specific embodiments, numerous modifications and variations could be made thereto by those skilled in the art without departing from the scope and spirit of the present disclosure set forth in the claims.

What is claimed is:

1. A fastener operating structure, comprising:
a holding base disposed at a first object;
a fastening-connecting unit, having a fastening portion being movably disposed at the holding base and configured to fasten the first object to a second object; and
a resilient component with two ends abutting against a portion of the holding base and the fastening portion, respectively;
wherein the holding base has a laterally penetrating portion defined by opposed open sides and a longitudinal side extending between the open sides, such that the second object laterally enters the laterally penetrating portion and pushes a guiding portion on a side of the fastening portion to guide elevation of the fastening portion, thereby the resilient component bias the fastening portion when a fastened portion of the second object is aligned with the fastening portion, wherein absence of any guiding portion on another side of the fastening portion, thus the second object is fastened by the fastening portion.

2. The fastener operating structure of claim 1, wherein the holding base has at least one holding portion whereby the holding base is disposed at the first object.

3. The fastener operating structure of claim 2, wherein the holding portion has a material storage space, and the holding base has a stamped surface which an external force is exerted on to press the holding portion into the first object and allow a material of the first object to enter or flow into the material storage space, thereby fitting the holding base and the first object together.

4. The fastener operating structure of claim 2, wherein the holding base has an abutting surface which an external force is exerted on, and the holding portion has an engaging portion which an external force is exerted on to allow an external force to be exerted on the abutting surface of the holding base such that the engaging portion is deformed and engaged with the first object, thereby fitting the holding base and the first object together.

5. The fastener operating structure of claim 1, wherein the holding base has a movement space, the fastening portion and the resilient component are movably disposed in the movement space.

6. The fastener operating structure of claim 5, wherein limiting portions are disposed on a top surface of the holding base, located on one or two sides of the movement space, and adapted to limit rotation of the fastening-connecting unit.

7. The fastener operating structure of claim 1, wherein the fastening-connecting unit comprises an operating portion, wherein the operating portion and the fastening portion are movably fitted together, fixedly fitted together or integrally formed.

8. The fastener operating structure of claim 7, wherein the fastening portion is fastened to the second object, and the second object has a corresponding fastening portion which the fastening portion is fastened to, the corresponding fastening portion having a wide hole portion and a fastened portion, the wide hole portion being larger than the fastening portion, the fastened portion being smaller than the fastening portion, wherein the fastening portion penetrates the wide hole portion so as to be fastened to the fastened portion.

9. The fastener operating structure of claim 8, wherein the fastening portion has a shaft member and a fastening member, the shaft member being disposed on a surface of the fastening member, having a smaller width than the fastening member and the fastened portion of the corresponding fastening portion, and being fastened to a fastened portion of the second object, thereby allowing the fastening member to be passed through the second object and fastened to the second object.

10. The fastener operating structure of claim 7, wherein the operating portion is a rotating element, the operating portion has a high portion and a low portion for respectively driving the fastening portion to undergo high and low movement to unfasten and fasten the second object.

11. The fastener operating structure of claim 1, wherein the resilient component is a non-laminated spring whose contraction does not require lamination, thereby taking up little space.

12. The fastener operating structure of claim 1, wherein the holding base has a receiving space for receiving a resilient component in whole or in part or receiving a fastening portion of the fastening-connecting unit.

13. The fastener operating structure of claim 1, wherein the holding base has a weldable surface such that the fastener operating structure is taken out of a carrier with a tool and placed on the first object so as to be welded to the weldable surface and thus fitted to the first object.

14. The fastener operating structure of claim 1, wherein the fastener operating structure is taken out of a carrier with a tool, and then a corresponding device calculates predetermined positions of the fastener operating structure and the first object, thereby allowing the tool to place the fastener operating structure at a position for fitting to the first object.

15. The fastener operating structure of claim 1, wherein the holding base has a movement space in which the fastening-connecting unit moves vertically, laterally or rotationally, moves vertically and then laterally or rotationally, moves laterally and then vertically or rotationally, or moves rotationally and then vertically or laterally, so as for the fastening-connecting unit to be fastened to the second object.

16. The fastener operating structure of claim 1, wherein the holding base and the first object are integrally formed.

17. The fastener operating structure of claim 1, wherein the guiding portion is an oblique surface portion, curved surface portion or arcuate surface portion.

18. The fastener operating structure of claim 1, wherein the laterally penetrating portion is a lateral groove portion or hole portion.

19. The fastener operating structure of claim 1, wherein the fastening-connecting unit has a shaft member and a fastening member such that the shaft member or the fastening member has a rotation-preventing portion, and the holding base has a corresponding rotation-preventing portion, wherein the rotation-preventing portion and the corresponding rotation-preventing portion jointly prevent rotation.

* * * * *